UNITED STATES PATENT OFFICE.

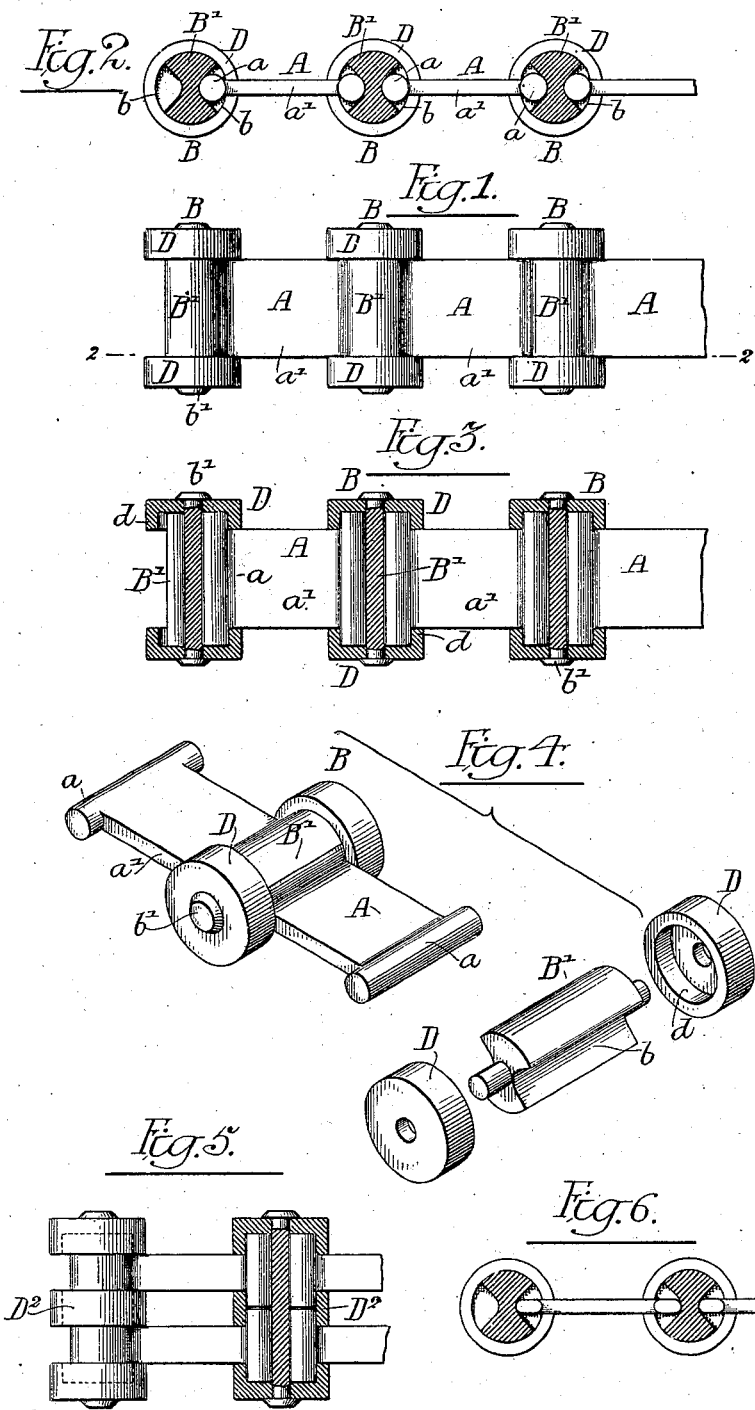

ZACHRY T. FURBISH, OF PHILADELPHIA, PENNSYLVANIA, ASSIGNOR TO NORTH BROTHERS MANUFACTURING COMPANY, OF PHILADELPHIA, PENNSYLVANIA, A CORPORATION OF PENNSYLVANIA.

DRIVE-CHAIN.

SPECIFICATION forming part of Letters Patent No. 726,669, dated April 28, 1903.

Application filed May 5, 1902. Serial No. 105,988. (No model.)

*To all whom it may concern:*

Be it known that I, ZACHRY T. FURBISH, a citizen of the United States, residing in Philadelphia, Pennsylvania, have invented certain Improvements in Drive-Chains, of which the following is a specification.

My invention relates to certain improvements in drive-chains; and the object of my invention is to so construct a chain of this type that it will be extremely flexible and readily and economically manufactured.

In the accompanying drawings, Figure 1 is a plan view of my improved chain. Fig. 2 is a longitudinal sectional view on the line 2 2, Fig. 1. Fig. 3 is a sectional plan view. Fig. 4 is a detached perspective view, and Figs. 5 and 6 are views of modifications.

A A are the links of the chain having T-heads $a$, preferably rounded, as in Figs. 2 and 4, so as to form a pivot for the link. The body $a'$ of the link may be made flat and solid, as shown, or any shape desired.

B is a connecting member, consisting of two heads D D and a socket-section B', having sockets $b\ b$ in each side, preferably tapered and rounded to fit the heads $a$ of the links. The caps D have flanges $d$, which fit over the ends of the sections B' and form bearing-flanges for the heads $a$ of the links. The caps D are secured to the socket-section B' in the present instance by riveting the projecting ends $b'$, which pass through openings in the heads, or the caps may be secured to the section by a bolt or other means of fastening.

In assembling the members of the chain one cap can be secured to the socket of each member B, and then the links A can be fitted to the sockets and the other cap applied and secured. The strain is not taken by the socket member B' but by the links and the caps D. This construction makes a very flexible chain and one especially adapted to a small sprocket-wheel. The sockets of the chain can be of any curvature, depending greatly upon the wheels to which it is to be applied.

In Fig. 5 I have shown a chain made of two series of links placed side by side, a single connecting member receiving the ends of the links of both sections. A ring $D^2$ is mounted on the socket-section between the two adjoining links and acts as one of the bearings.

In Fig. 6 I have shown the links made of flat steel, the heads not being rounded, as in Fig. 2. This form can be used when a cheap chain is desired.

I claim as my invention—

1. The combination of a series of links having T-heads at each end and connecting members including flanged caps in which the heads of the links are mounted, and a single piece for retaining each pair of caps in position, substantially as described.

2. The combination of a series of links having T-heads at each end and connecting members, each consisting of a socket-section and two flanged caps, substantially as described.

3. The combination of a series of links, having T-heads at each end and connecting members, each member consisting of a socket-section having transversely-curved sockets in each side for the reception of the heads of the links, and flanged caps extending over the socket member and acting as bearings for the links, substantially as described.

4. The combination of a series of links, having T-heads at each end and connecting members, each member consisting of flanged caps and a socket member having sockets in each side for the heads of the links, and projections at each end passing through the caps, substantially as described.

5. The combination of a series of links having T-heads at each end, each head being rounded to form a pivot and connecting members in which the heads of the links are mounted, said connecting members including means engaging the rounded parts of a pair of link-heads, and a piece for retaining said means in position, substantially as described.

6. The combination of two or more series of links, having T-heads at each end and connecting members in which the links are mounted, said members consisting of a socket-section to receive the heads of adjoining links, flanged caps at each end, and a bearing-ring between adjoining links, substantially as described.

In testimony whereof I have signed my name to this specification in the presence of two subscribing witnesses.

ZACHRY T. FURBISH.

Witnesses:
WILL. A. BARR,
JOS. H. KLEIN.